United States Patent [19]

Caplan et al.

[11] Patent Number: 4,527,012
[45] Date of Patent: Jul. 2, 1985

[54] COMMUNICATIONS SWITCHING SYSTEM WITH MODULAR SWITCHING COMMUNICATIONS PERIPHERAL AND HOST COMPUTER

[75] Inventors: Jerome S. Caplan, Henrietta; James W. Delmege, Rochester; Robert R. Laman, Rochester; Christine Navarro, Rochester, all of N.Y.

[73] Assignee: Redcom Laboratories Inc., Fairport, N.Y.

[21] Appl. No.: 462,583

[22] Filed: Jan. 31, 1983

[51] Int. Cl.³ .............................................. H04Q 3/54
[52] U.S. Cl. ................................................. 179/18 ES
[58] Field of Search ................................... 179/18 ES

[56] References Cited

U.S. PATENT DOCUMENTS 3,974,343  8/1976  Cheney et al. ................ 179/18 ES
4,287,567  9/1981  Lumsden ............................ 364/900
4,412,282  10/1983 Holden ............................... 364/200

OTHER PUBLICATIONS

"Design and Service Features of the EWS Electronic Switching System from the Administration's Point of View", Heinz Kunze, *Electronic Switching: Central Office Systems of the World*, IEEE Press, 1976, pp. 244–256.
"Architecture of a New Line of Digital Switches", H. Suckfüll, *Electronic Switching: Digital Central Office Systems of the World*, IEEE Press, 1982, pp. 180–186.
"Computer Software Controls Modern Telephone Switches", Bierman and Cashin, *Telesis* (Canada), Oct. 1979, pp. 4–10.

*Primary Examiner*—Thomas W. Brown
*Attorney, Agent, or Firm*—Martin LuKacher

[57] ABSTRACT

A communications switching system is controlled as a peripheral device to a general purpose digital host computer or other host device. The switching system has a plurality of ports for telephone lines and/or trunks and makes connections to the ports. The host computer is programmable at high level to obtain customized switching applications. The switching processes are carried out in the switching system under control of high level commands. The commands are formatted to identify the command functions and the ports at which the switching and control actions are to be carried out. These ports may be provided by separate modular switching units, each having processors for carrying out the switching functions at the designated ports and for distributing the commands in accordance with the command format to the designated port regardless of which of the modular switching units has the port. Responses as to the execution of the switching events are also conveyed to the host computer in a format which designates the response function and the port at which the function occurred. The switching units may be equipped with asynchronous serial data links for connecting one or more host computers or devices to the modular switching peripheral units.

10 Claims, 8 Drawing Figures

COMMUNICATIONS SWITCHING SYSTEM WITH MODULAR SWITCHING COMMUNICATIONS PERIPHERAL AND HOST COMPUTER

DESCRIPTION

The present invention relates to a communications switching system which establishes communication between ports to which circuits such as telephone lines and/or trunks are connected and which is controlled as a peripheral device by a host computer or other host device which programs the switching and control actions and ports at which these switching and control actions occur at high level while the switching protocols are carried out at low level, thereby simplifying programming, which does not require detailed knowledge of telephone switching and control processes, and may be used to effect customized switching applications.

Telephone switching functions are predicated upon the states of the ports, which are determined by the states of the circuits, such as lines and trunks, which are connected thereto. Knowledge of how such circuits operate and switching protocols is required in order to effect switching functions. For various switching system applications, not only must the sequence of switching events be controlled, but also the switching functions must be performed in accordance with the requisite protocols. Integrated communication switching systems have been provided which require that computer control be exercised at a very low level so that the protocols can be followed. Heretofore, it has been necessary to design complex, integrated computer controlled switching systems in order to satisfy special switching applications. The design work has required detailed knowledge of telephone switching techniques and protocols, and thus must be performed by designers having special expertise.

There are many special purpose applications requiring switched communication, either internally or connected to the public network, which cannot practically be performed by complex integrated computer controlled switching systems because of the cost and complexity of designing, implementing and installing such systems. Such applications include answering service systems, command and control systems, cellular radio, automatic call distributors, switched intercom systems, air traffic control systems, office equipment communication and control systems for the so-called "office of the future" wherein digital work stations may have to be interconnected, and various private voice/data switching systems. The overall program of switching events to effect such special purpose switching applications would be within the skill of a technical programmer or systems analyst familiar with working with a general purpose computer. General purpose computers and communications switching systems are, however, not generally compatible; nor is the general purpose computer efficient in executing telephone switching system protocols which must be carried out by complex low level processes. Telephone switching systems themselves are neither designed nor adapted for general purpose computer control. Accordingly, general purpose computer and telephone switching systems have not been married. It is a feature of this invention to provide for the marriage of the general purpose computer and the telephone switching system; allowing the switching system to be operated as a peripheral to the computer and to carry out switching processes at low level while the overall switching functions are controlled at high level by the computer, thereby enabling special purpose switching applications to be provided in a practical and cost effective manner.

Accordingly, it is a principal object of the present invention to provide an improved communications switching system wherein a switching system is controlled by one or more host devices, such as include general purpose digital computers, operating at a high level to provide for customized switching applications.

It is a further object of the present invention to provide an improved communications switching system which is controlled by a host computer or computers, as a peripheral to the computer or computers, so as to provide switched internal communication or connections to the public telephone network under control of the host computer or computers.

It is a still further object of the present invention to provide an improved communications switching system wherein switching between trunks and lines is implemented within a switching system by a host computer which is programmable at high level to obtain switched communications which can be customized for special applications, for example as answering service, automatic call distribution, or dispatch of calls, among others.

It is a still further object of the present invention to provide an improved communications switching system wherein a general purpose host computer manages complex communications switching functions without complexity in the hardware or software of the host computer.

It is a still further object of the present invention to provide an improved communications switching system wherein switching operations are remotely controllable from a host computer via a data communications link as by asynchronous, serial transmission over the link and without modification to the host computer hardware or operating system software.

It is a still further object of the present invention to provide an improved communications switching system utilizing an expandable time division multiplex (TDM) digital switching system to manage and carry out telecommunications switching functions under control of a host computer which commands the switching functions, which commands can be programmed in the host computer at high level without need for low level programming to implement specific switching events.

Briefly described, a communications switching system embodying the invention comprises communication switching means having a plurality of ports which effect switching and control actions (switching events) at the ports. Such events include making connections between a plurality of telephone lines and/or trunks which are connected to the ports. A host computer or device generates digital signal commands corresponding to a plurality of switching events and may receive digital signal responses related to the execution of these events at the ports. An interface, as may include a data link or links, connects the host computer or computers and the switching means so that the commands and responses are transmitted therebetween. The switching means has processing means for carrying out the switching events at the ports. The switching means also has means for conveying the commands to the processing means for the ones of the ports at which the switching events are to be carried out, thereby controlling the events exclusively in response to the commands and to the state of the ports. The processing means may operate at low level to carry out the various protocols necessary to effect the switching functions, while the host computer operates at high level.

The foregoing and other objects, features and advantages of the invention, as well as a presently preferred embodiment thereof, will become more apparent from a reading of the following description in connection with the accompanying drawings in which.

Figure 5:
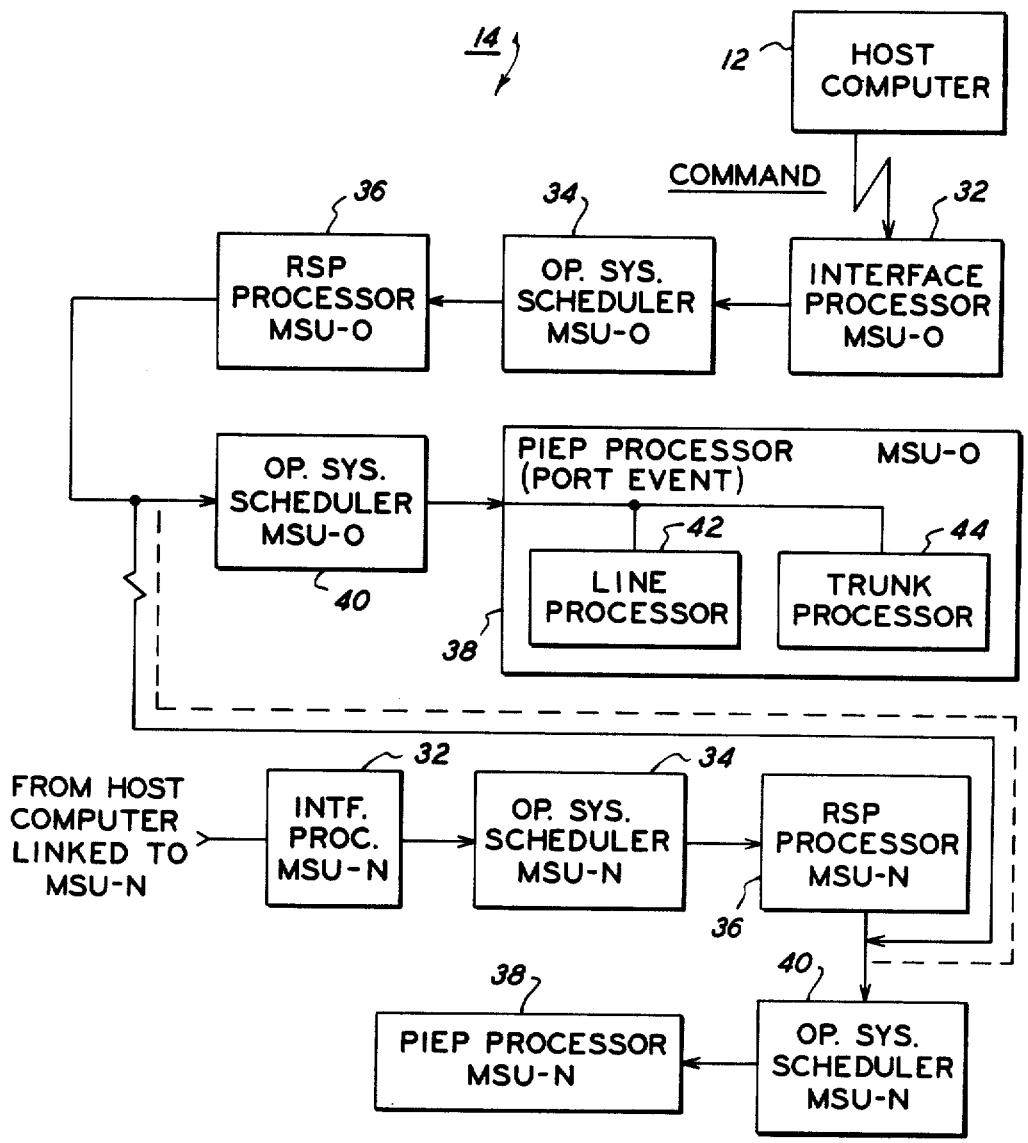
FIG. 5 is a more detailed block diagram of the system shown in FIG. 1, when operating to control switching events upon commands from the host computer.
Figure 7:
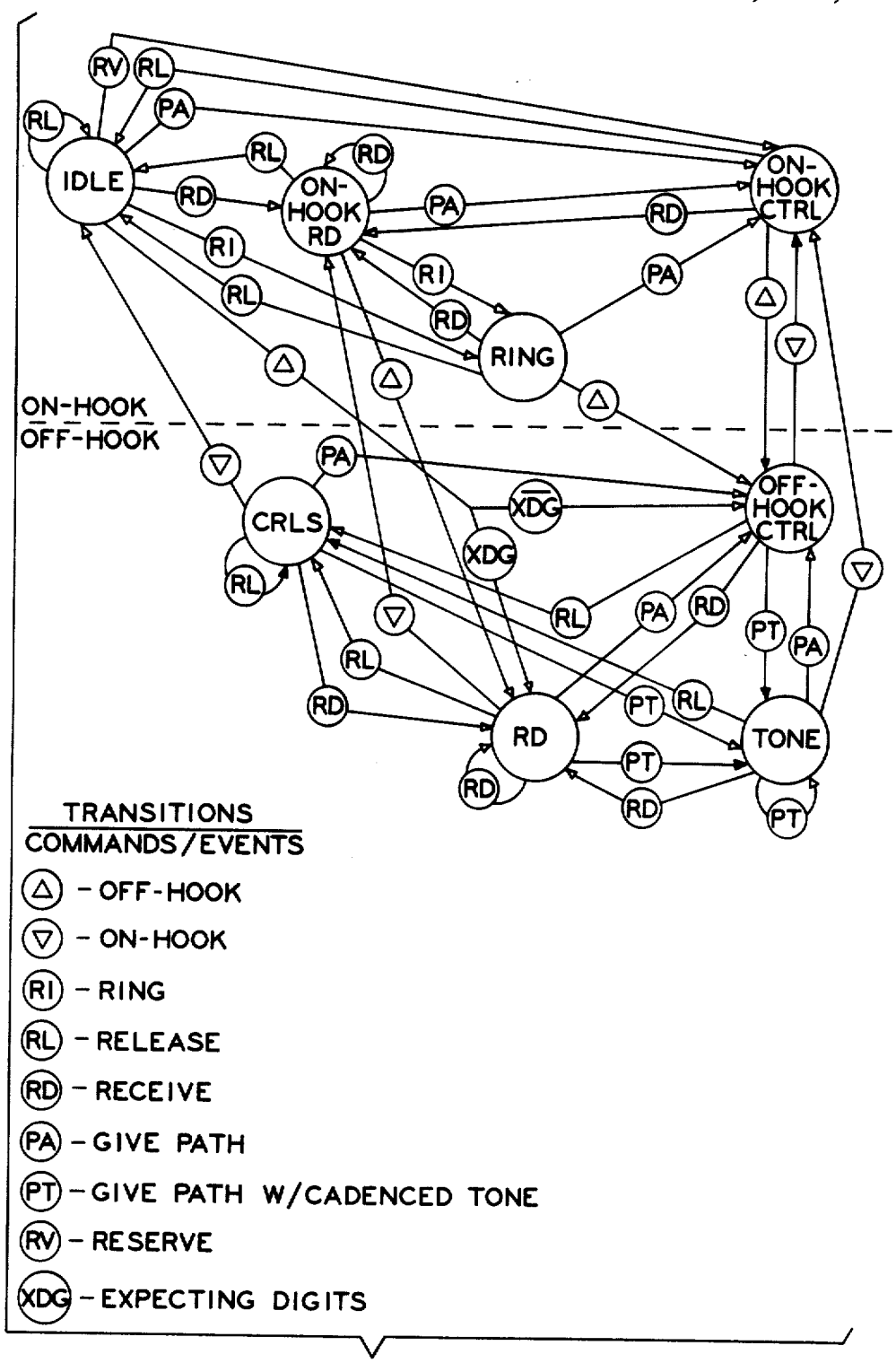

FIG. 7; is a state diagram of the line processor shown in FIG. 5; and

Figure 8:
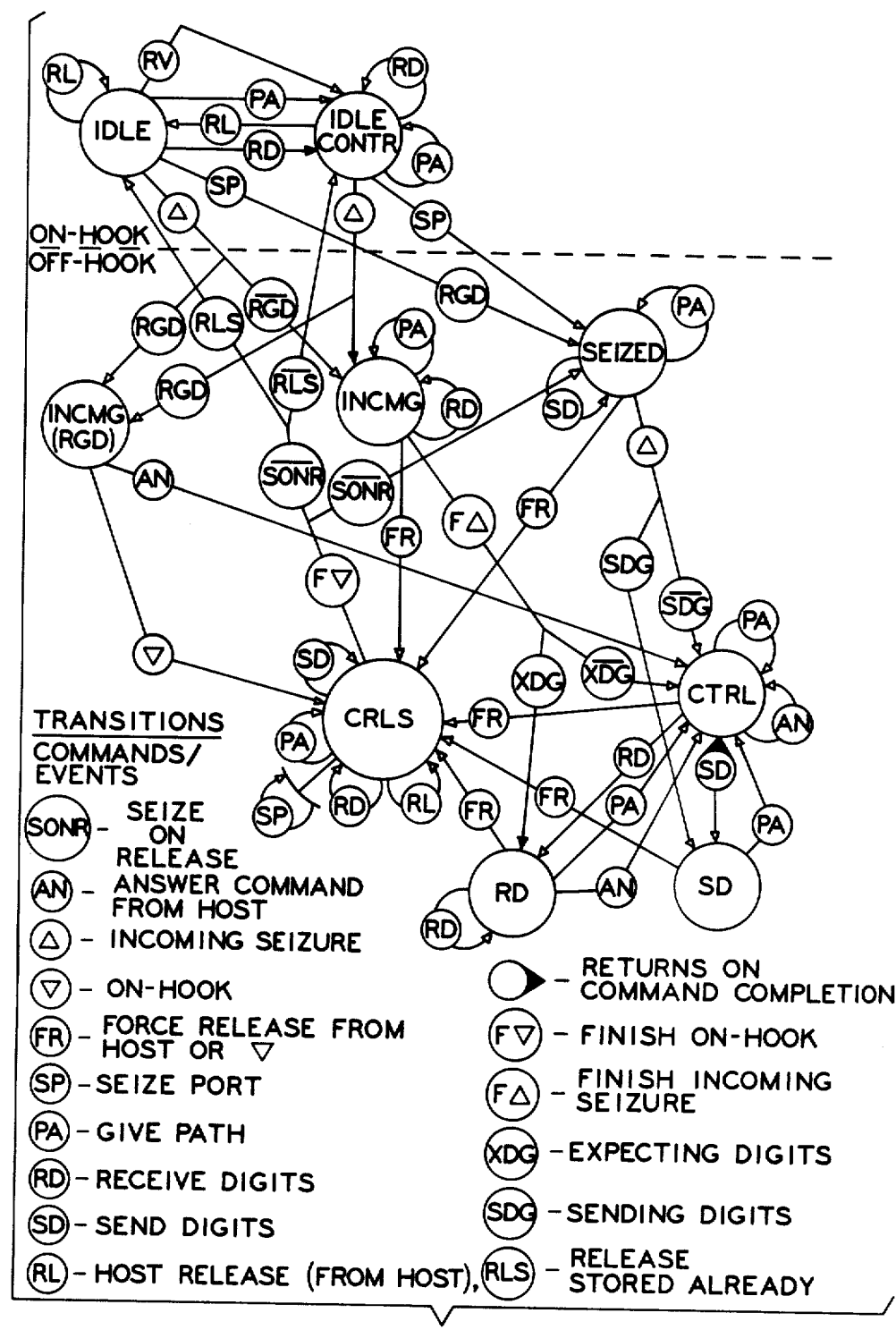

FIG. 8 is a state diagram of the trunk processor shown in FIG. 5.

Figure 1:
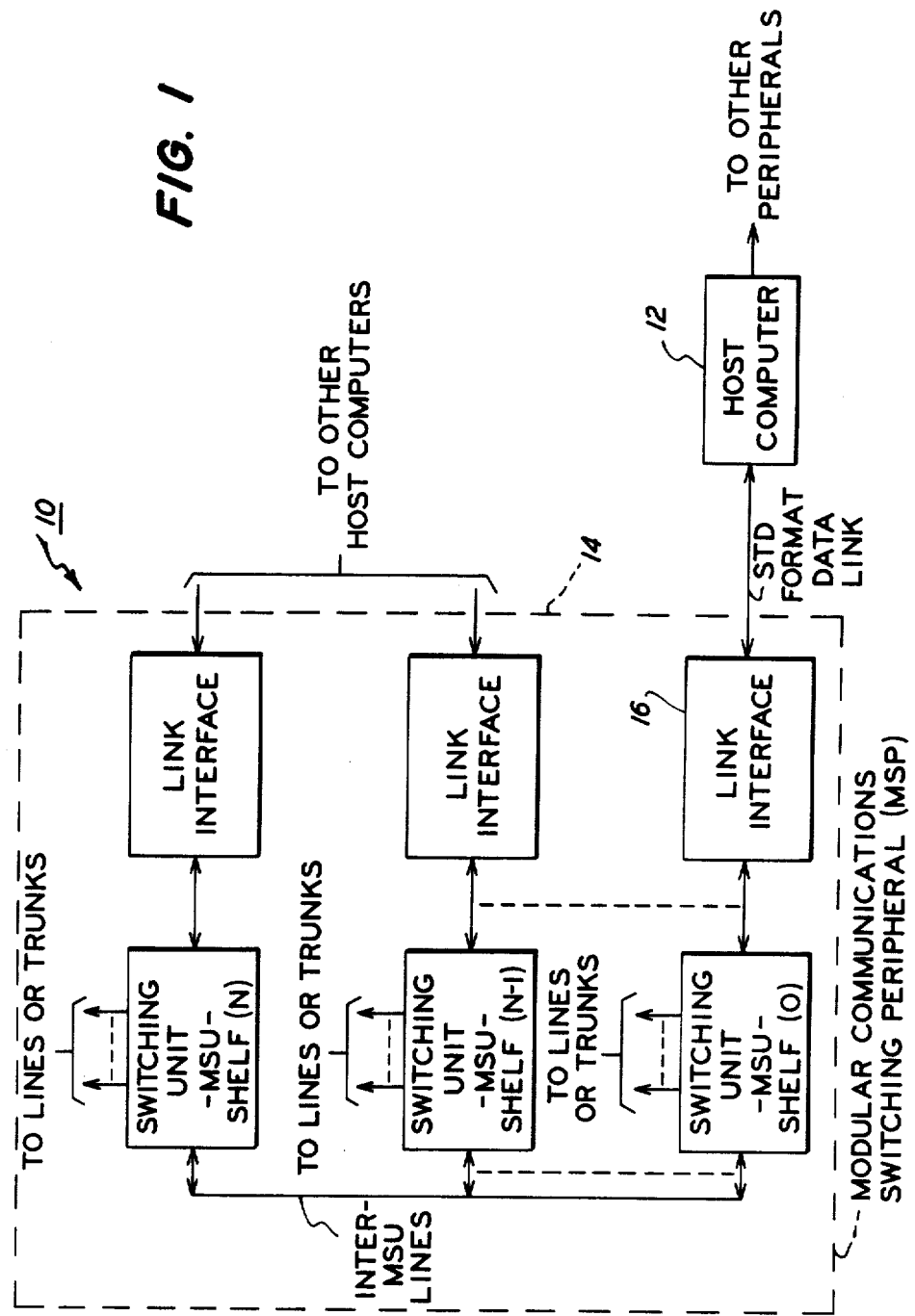
FIG. 1 is a block diagram of a communication switching system including a host computer and a modular switching communications peripheral (MSP) thereto.

Referring to FIG. 1 there is shown a communications switching system 10 which is provided by the invention. The system includes a host computer 12 and a modular communications switching peripheral system (MSP) 14. The host computer 12 is a general purpose digital computer. It may for example be a minicomputer or a microcomputer. Larger computers may be used if desired. The system 10 requires the use of at least one host computer 12. Other host computers or host computer links may be provided if greater bandwidth (speed) of data transfer with the switching peripheral 14 is desired. The switching peripheral 14 is preferably a modular switching system made up of a plurality, for example, up to eight, modular switching units (MSUs) which may be disposed on separate shelves of a telephone equipment rack. These MSUs are sufficiently small to be contained on individual shelves. The modular switching system consisting of the MSUs is of a hardware configuration described in U.S. Pat. No. 4,228,536 issued Oct. 14, 1980 to Gueldenpfennig and Breidenstein. Inasmuch as each MSU occupies a separate position or shelf, the MSUs are identified as the shelf (0) through shelf (N) MSU. Only three of the MSUs or shelf (0), shelf (N−1) and shelf (N) are illustrated to simplify the drawing.

The MSUs are interconnected by inter MSU lines. These lines convey data and control signals between the MSUs. Data entering any MSU is broadcast between the MSUs which use the data dedicated or addressed to them. The MSUs are connected to separate groups of lines or trunks. Each MSU has a plurality of ports, for example, up to 56 ports. These ports may be connected to different telephone circuits, either lines or trunks or utilities, for example tone generators, DTMF receivers, etc. The switching protocols for making the connections between the lines or trunks of any individual MSU or any MSUs in the peripheral 14 are determined by the architecture of the MSUs. Each MSU is modular and contains all equipment necessary for making connections and causing the switching events to occur at its respective ports.

The host computer 12 is connected to the peripheral by a standard format data link. In accordance with the preferred embodiment of the invention, this data link may be an EIA RS232c or 20 ma loop serial channel which transmits serial data asynchronously. The data may be organized and the link scheduled in accordance with the American National Standard ANSI X3.28-1976, sub category 2.3/A4. Communication between the host computer 12 and the peripheral 14 is in accordance with the communications protocol dictated by the standard. The standard indicates the nature of the bits making up each byte of data, protective time-outs, error recognition procedures and data integrity checking. A link interface circuit 16 is provided for each MSU unit of the peripheral 14. This link interface is designed in accordance with the standard so as to enable the data from the host computer (commands) to be transmitted to the switching units of the peripheral 14 and responses from the switching units to be returned to the host computer 12. Each switching unit is provided with its own link interface. Different host computers may be connected to each switching unit. The link interface transfers the data into the switching unit wherein it is transmitted among the switching units (broadcast) via the inter MSU lines. Accordingly, each host computer will communicate with the entire array of switching units in the peripheral 14.

The ports of the switching units to which the lines or trunks may be connected as well as other ports therein, which are connected to other utilities such as tone generators or DTMF receivers, are organized by being provided by different circuits on different circuit mounting means, which are printed circuit cards, which are located in the switching units. Each switching unit may have sixteen of such cards. There may be, for example, up to four circuits which are associated with different ports on each card. Any data link connected to any MSU unit (any shelf) within the communication switching system can be used to direct any command to any port in the system regardless of which of the MSU shelves the port is located on. This is accomplished by specifically addressing the command to a given port. In the case that the port is on a shelf other than the shelf to which the link interface is connected, the inter MSU lines convey the command message to the shelf which contains the address port. Of course, there may be overall systems commands which can cause some system wide action to take place as well as port commands directed to a single port.

The execution or attempted execution of these commands results in responses which generate return messages, for example, error messages are returned to the host computer 12 when a switching event at a port fails. Debugging commands may also be used to provide responses as to the status of the ports.

Figure 2:
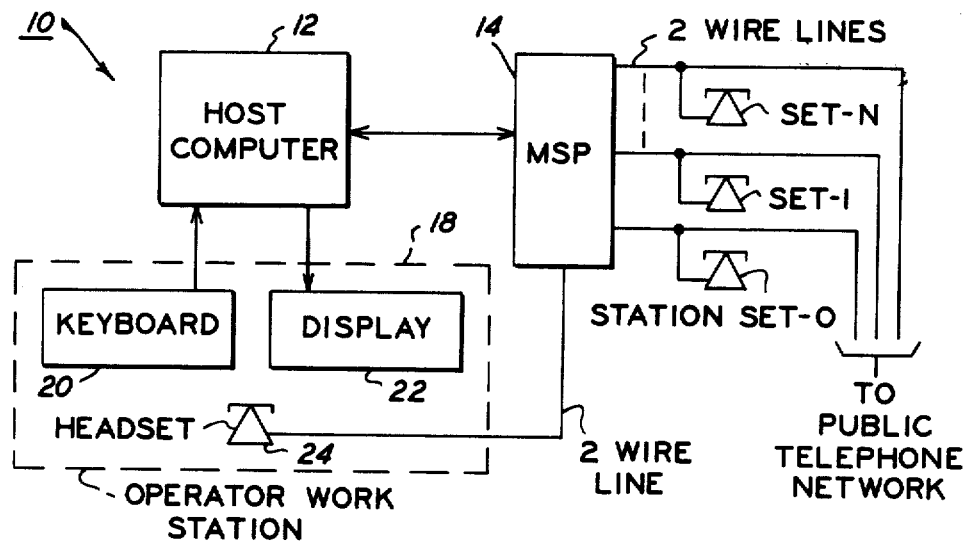
FIG. 2 is a block diagram illustrating the operation of the system shown in FIG. 1 for a special purpose application as an answering service system.

Referring to FIG. 2 there is shown one of the many applications for which the communication switching system 10 shown in FIG. 1 may be suitable and may be programmed to provide, by programming the host computer 12. This is an answering service application. The system includes the modular switching peripheral 14. A host computer 12 is connected to the modular switching peripheral 14 by a data communications link. An operator work station 18 having a keyboard 20, a display 22 and a telephone headset 24 is shown. This operator work station is, in the answering service application, one of several operator work stations which are connected to the switching system 10. The connection between the headset 24 of the illustrated work station 18 is by way of a two wire telephone line to a port of the MSP 14. The other ports of the MSP are connected to the telephone sets of the customers served by the answering service. The lines to these telephone sets go to the public telephone network. Accordingly, the MSP is connected in bridging relationship with the sets of its customers and thence to the public telephone network.

Consider the operation of the answering service application, for example, if the system is programmed to answer the customer's calls only if the customer did not answer them in fifteen seconds. If one of the customer's phones rings, for example, station set (0), the ringing state is reported as a response to the host computer 12. The host computer starts a timer, and upon the expiration of the timer, as detected in the host computer 12, so long as there has been no change in status on the line connected to station set (0), an idle operator, in this case operator work station 18, is selected by the host computer which enables the headset 24 to communicate with the line connected to station set (0). The display indicates that the particular customer's phone has been intercepted. Simultaneously, the computer commands the MSP to answer the line and connect it to the headset of the operator work station 18. The operator is then connected to the person calling the customer and takes a message. After taking the message the operator may hit the release key on the keyboard 20. The computer then generates a command to the MSP 14 to disconnect the operator from the calling party by giving silence to each. It also directs the MSP to hang up on the customer's line by the use of a release command. The release command causes the customer's station set, set (0) in this example, to go back on hook and ready to receive additional calls from the public telephone network. The system shown in FIG. 2 may, of course, handle many calls arriving at the same time by intercepting them and directing communication between the caller and different operator work stations. All of these switching functions are under the control of the host computer which need only be programmed on a very high level basis to generate the commands to cause the communication paths between the operator work stations and the ports to which the station sets are connected as well as release commands to allow the station sets to go back on hook. These operations and functions are readily programmable using well-known programming and system analysis techniques by personnel who need not be expert in telecommunication switching. This is because the telecommunication functions and all of their necessary protocols are carried out automatically by the MSP 14 in response to the host computer commands. The MSP 14 also reports the result of the commands (the execution of the switching functions) so that the host computer can go on to the next command or other operations of the particular application which is implemented by the program therein.

Figure 3:
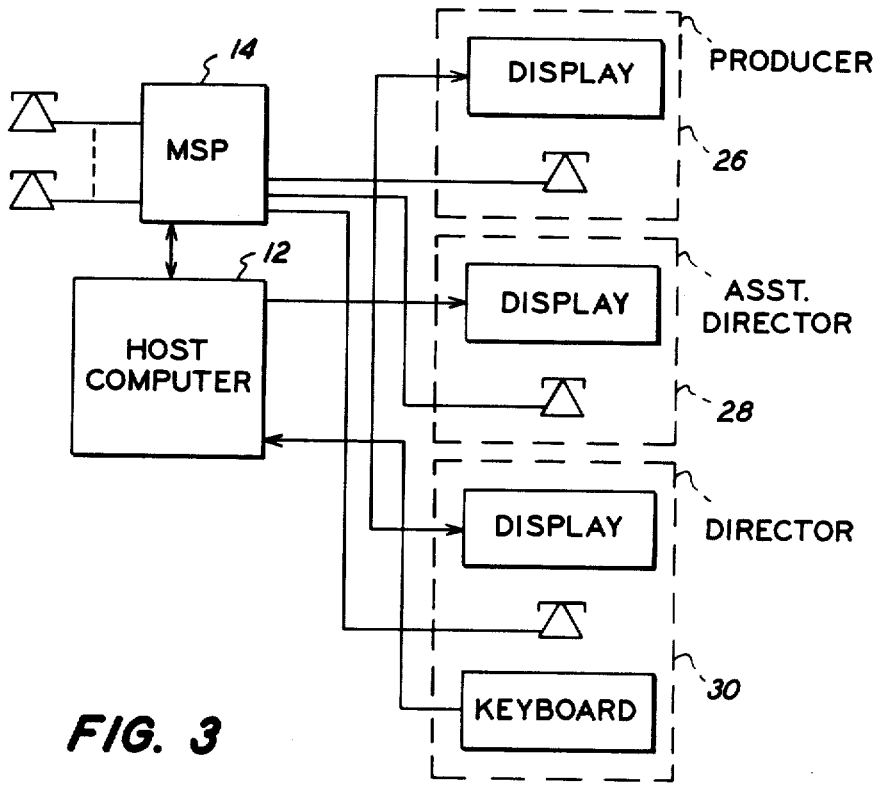
FIG. 3 is a block diagram illustrating the system shown in FIG. 1 providing another special purpose application as a dispatch center for a television remote pickup, as for sports events.

Referring to FIG. 3 there is shown a switching application or a remote television pickup, such as the camera crews at a sports event and the producer and directors who are usually located in a truck or van near the arena. The system utilizes the MSP 14 which is connected to the internal telephone sets of the camera crews as well as to telephone sets at the producer's station, the director's station and the assistant director's station. The host computer 12 is connected to displays at the producer's station 26, the assistant director's station 28 and the director's station 30. The director's station also has a keyboard by which the director can communicate with the remote camera operators as well as with the producer and assistant director. The director is completely responsible for communications between the various personnel in the truck and in the sports arena. He accomplishes such communication by the use of the keyboard. The host computer which is connected to the keyboard receives the request for connections and disconnections and provides paths and connections between the various stations. Also communications may be demanded by any of the operators or directors by their going off hook. In such an event, a request for service will be displayed on the director's display console and communications will be provided only if the director so desires. It will be apparent that the host computer can readily be programmed to cause connections to be made between the telephone sets which are authorized by the director and no other sets.

The necessary commands are relatively simple and indicate the switching function as well as the ports on which the function is to be carried out. The host computer can readily be programmed to convert the keyboard data into these commands so as to provide the connections and paths through the MSP between the telephone sets of the personnel both on the field and in the control truck.

Tables A and B below indicate the illustrative repertoire of commands and responses between the host computer 12 and the MSP 14. The command can be merely a two consecutive byte digital signal as is the response. The argument following the command has different meanings as shown in Table C below. In the case of global commands to all ports and all MSUs on every shelf, there is no argument. These, for example, are the initialize and end commands.

The commands which are directed to specific ports identify these ports by an equipment number. This equipment number has four bytes and is in general indicated in Table C by "eeee". The first byte indicates the shelf or MSU number. This may be a byte having a value of from 0 to 7, where there are eight shelves or MSUs in the system. The next two bytes indicate the component carrier or card number in the shelf. In the above mentioned system where there are sixteen cards these two bytes will contain digits from 1 to 15 (01 to 15). The last byte indicates the circuit number of the desired port on the circuit card identified by the first three bytes. For example, this may be a number from 0 to 3, where there are a maximum of four ports per card.

With the commands and with knowledge of the responses, any type of special switching application can be programmed directly on the host computer without intimate knowledge or expertise in telephone switching protocols. Only the mnemonics of the commands, and the identification of equipment numbers, time or durations or numbers of digits required for internal communications (xx) need be provided in the host computer programming.

Figure 4:
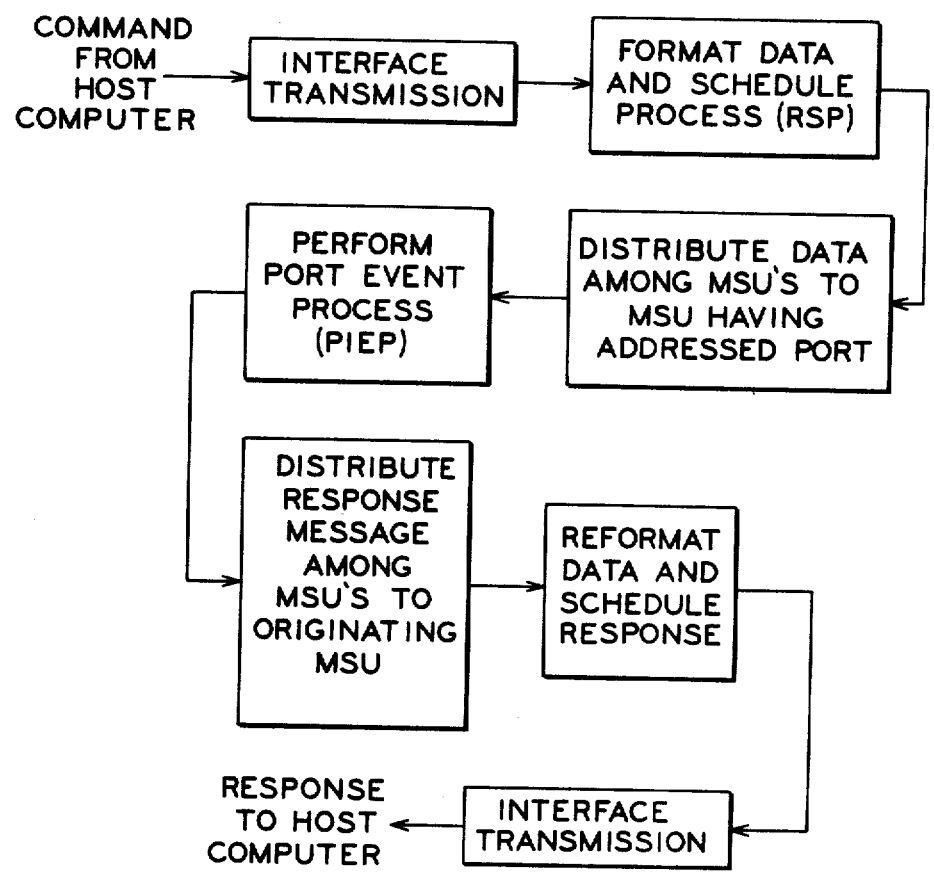
FIG. 4 is a flow diagram illustrating the processes carried out in the system shown in FIG. 1.

The flow of data through the switching system is illustrated in FIG. 4. The commands are generated in the host computer and transmitted through the interface during the interface transmission process. Upon arrival at the MSU unit (shelf) to which the link is connected, the command data is formatted and scheduled for processing. This is referred to as the remote signal process (RSP), since it is carried out in the switching peripheral 14. The data is formatted into machine language for handling in the remote signal process. The commands are also scheduled for processing and tagged with information as to the shelf on which they are received. This remote signal processing, therefore, enables asynchronous serial data to be transmitted through the interface link. The data is then distributed among the MSUs to the MSU having the port to which the command is addressed. The data is conveyed along the inter MSU link to the MSU having the port where the switching event is to be executed. At the port, the port event process is executed. The execution of this port event process is under the control of the command. The process is called a PIEP process.

As the commands are executed or as responses as to the condition or state of the ports are scanned, these responses are distributed among the MSUs to the originating MSU. The originating MSU is the MSU to which the interface link carried the command which generated the port event process, and is especially useful when several host computers are used in the switching system 10. Upon arrival at the originating MSU, the response data is reformatted into serial data and scheduled for transmission. The transmission is via the serial data link back to the originating host computer.

The individual modular switching units, MSU-0 to MSU-N, have the hardware described in the above identified Gueldenpfennig and Breidenstein patent to establish processors for the command data. These processors are illustrated in FIG. 5. MSU-0 is above and MSU-N is below the dashed line. The commands from the host computer first arrive at an interface processor 32 which collects the command message from the host computer. After the entire message has been received and acknowledged, it is controlled by the operating system scheduler 34. The scheduler assembles the data into an operating system queue which is associated with the process in the switching peripheral. The scheduler is informed that the schedule process has a queue entry and should be scheduled. At a later time, control passes to an RSP processor 36. This processor reformats the data into machine language internal representation which provides a tag as to the originating MSU where the machine language command is addressed by bytes therein to a PIEP processor 38. This processor may be in the MSU which originated the command or a similar PIEP processor in any of the other MSU units.

The scheduler 34 involves a prioritized scheme where scheduled processes are periodically passed control. Once given control, the scheduled process determines whether any work is to be performed. As soon as it completes processing of the smallest contiguous portion of work possible, control must be returned to the scheduler. This allows the scheduler to maintain a prioritization among scheduled processes without the capability of forcibly revoking control from an active scheduled process.

A scheduled process may communicate with other scheduled processes by transmitting messages. This is done with the communications facilities of the operating system. At the option of the scheduled process transmitting the message, the message can be sent within the confines of a physical MSU, or placed on an Inter-MSU communications bus, for receipt by any, or all, MSU's within a system. The scheduled process transmitting the message identifies the intended receiver by specifying a target address.

The target address is always another scheduled process. For inter-MSU messages, the targeted scheduled process may be replicated in different MSU's. Upon receipt of a message for a scheduled process within the MSU, the operating system queues the message for the scheduled process. The queueing is first-in, first-out (FIFO).

There is a single queue for each scheduled process. Furthermore, a queue is owned by a scheduled process; only the owner is to de-queue messages from its queue.

There are two basic scheduling routines. One is involved only upon failure of the first to find work; they are called primary and secondary scheduling. All tasks are schedulable at the primary level. Scheduling at the primary level is strictly prioritized. In addition to being schedulable at the primary level, some scheduled processes are schedulable at the secondary level. Scheduling at the secondary level is not prioritized; scheduled processes are sequentially passed control. The elemental unit of time for scheduling is a scheduling scan. At the beginning of a scheduling scan, primary scheduling occurs.

Starting at the beginning of a scheduling scan, the primary scheduler passes control to the highest priority scheduled process which has an outstanding request to execute. Whenever a scheduled process returns control, it must inform the scheduler whether or not any substantial work was performed. If the scheduled process performed substantial work, then the scheduling scan is terminated; primary scheduling is re-invoked at the highest priority level. However, if the scheduled process indicates no substantial work has been accomplished, then the scheduler passes control to the next highest priority scheduled process with an outstanding request to execute. This continues until a scheduled process returns control with an indication that substantial work has been performed. If all scheduled processes with outstanding requests are called, and none returns an indication that substantial work has been performed, then scheduling passes to the secondary level.

Some scheduled processes may be identified as schedulable at the secondary level. Regardless of their relative priorities, the scheduler passes control to the next secondary scheduled process in a round-robin fashion, based on the last scheduled process to which control was passed at a secondary level (in a previous scheduling scan). Upon return of control to the scheduler, the scheduling scan is terminated regardless of whether or not the scheduled process indicated any substantial work has been performed. This prevents scheduling overhead for the secondary level, which may have a large number of possible scheduled processes, from interfering with response to primary scheduled processes.

In order to execute a scheduled process at the primary scheduling level, it is necessary for there to be a request to execute. There are two ways such a request can exist. The first is related to queued messages for the scheduled process.

A scheduled process which de-queues messages from a queue is identified with that queue. Recalling that only one scheduled process can de-queue messages from a given queue, it is obvious that a queued message requires the services of a particular scheduled process. Thus, the existence of a non-empty queue requires a request for a specific scheduled process to be outstanding. This type of request is managed by the communications facilities. Upon queuing a message, a request is established for the Scheduled Process owning the queue. The request will remain outstanding until the last message is removed from the queue, at which time the dequeueing scheduled process will remove its request to execute. The other way that a request to execute can be outstanding is called a permanent request to execute.

A permanent request to execute is an indication that the Scheduled Process requires an opportunity to execute at its priority level before scheduled processes at a lower priority level are executed.

The following illustration is provided to depict the primary and secondary scheduling algorithms. In this description, there are a total of N scheduled processes. Also, the term "JOB" is interchangeable with "Scheduled Process".

```
DO FOREVER
SCHEDULING _ SCAN = NOT _ DONE
DO FOR I = 1 TO N, WHILE SCHEDULING SCAN = NOT DONE
IF JOB (I) HAS AN OUTSTANDING REQUEST TO EXECUTE
EXECUTE JOB (I)
IF JOB (I) SAID IT DID ANY SIGNIFICANT WORK
SCHEDULING _ SCAN = DONE
END _ IF
END _ IF
NEXT I
END _ DO
IF SCHEDULING _ SCAN = NOT _ DONE
INCREMENT POINTER TO NEXT SECONDARY SCHEDULED PROCESS
EXECUTE NEXT SECONDARY SCHEDULED PROCESS
SCHEDULING _ SCAN = DONE
END _ IF
END _ DO
```

Each of these units is equipped with the same processors. In addition to MSU-0, only the Nth modular switching unit, MSU-N, is illustrated in FIG. 5 for the sake of simplicity. It will be observed that this MSU like the other MSUs in the system 14 contains an interface processor 32, an operating system scheduler 34, an RSP processor 36, a PIEP processor 38 and another operating system scheduler 40. It is the operating system scheduler 40 which determines whether the PIEP processor which controls the address port is in the originating MSU or in some other MSU. When in the originating MSU the command data is transferred to the input queue for the PIEP scheduled process in the processor 38 of MSU-0. For example, if the Nth MSU (MSU-N) contains the addressed port, the commands are conveyed or broadcast to the operating system schedulers of all of the MSUs and the operating system scheduler for MSU-N transfers it to the input queue for the PIEP processor in the Nth MSU.

The PIEP processor has a line processor 42 for lines connected to the ports of the MSU and a trunk processor 44 for trunks connected to the MSU. When the PIEP processor receives control based on the operating system scheduler operation, it dequeues the reformatted command signal. Then, depending upon the command (e.g., SD for send digits, RD for receive digits, etc.—see Table A), control is passed to the line processor or the trunk processor. Depending upon the state of the port, control is further passed to the processor for the given state/command combination. A plurality of lower level messages are then handled in the processor and the requisite switching event which is commanded is executed. The line processor 42 is shown in FIG. 7 by its state diagram. The trunk processor 44 is similarly shown in FIG. 8.

In the line processor 42, the on hook states are IDLE, RD (receiving digits), CTRL (control), and RING. These are the states of the line when the telephone set is on hook. There are similar off hook states, CTRL, TONE, RD (receiving digits) and CRLS (controlled release). The IDLE state is the initial or initialized state. The processor 42 is initialized to IDLE on power up. The port is then on hook. The states where the port is on hook and off hook are indicated above and below the dash line on the drawing in FIG. 7. The RING state is when the set is ringing. This is also an on hook state. The on hook RD state is the state of the port when the port is under control of the commands from the host computer and is connected to another port or to a tone generator where the tone is a steady tone; not a cadenced tone such as a busy tone. The on hook CTRL state is the same as the off hook state except that the port is on hook (the telephone set is in its cradle). The RD states are the states of receiving digits and reporting them to the host computer (when the port is off hook). If the port goes on hook, the port becomes idle. The TONE state is controlled by the host computer where the port is receiving a cadenced tone such as for busy signal, ring back and the like.

The interconnections between the states are either commands from the host or asynchronous indications of events from the line or port itself. In some cases the transition lines have a fork which can depend on the commands, for example if the command involves a number of digits which are expected so as to carry out an operation, the transition can be to the receiving digits (RD) or to the off hook CTRL state. The table of transitions, whether commands or events and their labelling on the lines connecting the states, which in part of FIG. 7 of the drawing, indicates the protocols under which switching events are carried out. It will be observed that this state diagram defines the program and therefore the structure of the PIEP processors 38 insofar as their line processors 32 are concerned.

FIG. 8 is a similar state diagram for the trunk processor 44. The table of transitions, whether commands or events, which is part of FIG. 8 of the drawing indicates the protocols under which the switching events are carried out under control of the commands and the states of the trunk. Inasmuch as different types of trunks may be connected to the ports, there are two incoming (INCMG) states for conventional and for ring down (RGD) trunks. Also in the case of trunks there is a SEIZE state. In this state the trunk is seized for use. The INCMG states are states where the trunk is seized inwardly. It has come off hook expecting service, i.e., trying to make a call into the switching peripheral 14. There is also an IDLE controlled state which is an on hook state where the host computer limits the availability of the trunk until it returns to an IDLE condition; for example, the trunk would not be available for group functions where a group of events is supported on a number of trunks at the same time. This may be the case when conferences are programmed on the host computer.

Another state for trunks not present for lines is the sending digit (SD) state where the trunk is instructed to send digits to the central office. In the RD (receiving digit) states the trunk is instructed by the host computer to receive digits from the central office. The CTRL state is similar to the line circuit CTRL state where the trunk is under control of the host but off hook and listening to voice along a signal path or to a tone. The controlled tone may either be steady or cadence. The controlled release (CRLS) state is a state having many transitions associated with it such as the seize port state. In this state commands have portions of their message stored such that different switching functions, for example, seize on release (SONR), can be carried out.

From the state diagrams the design of the PIEP processor is dictated and defined. The particular codes which are stored in the memory of the MSU and fetched in the course of the processor's operation depends upon the specific hardware configuration, which is the type of integrated circuit, memory and microprocessor chips used.

Figure 6:
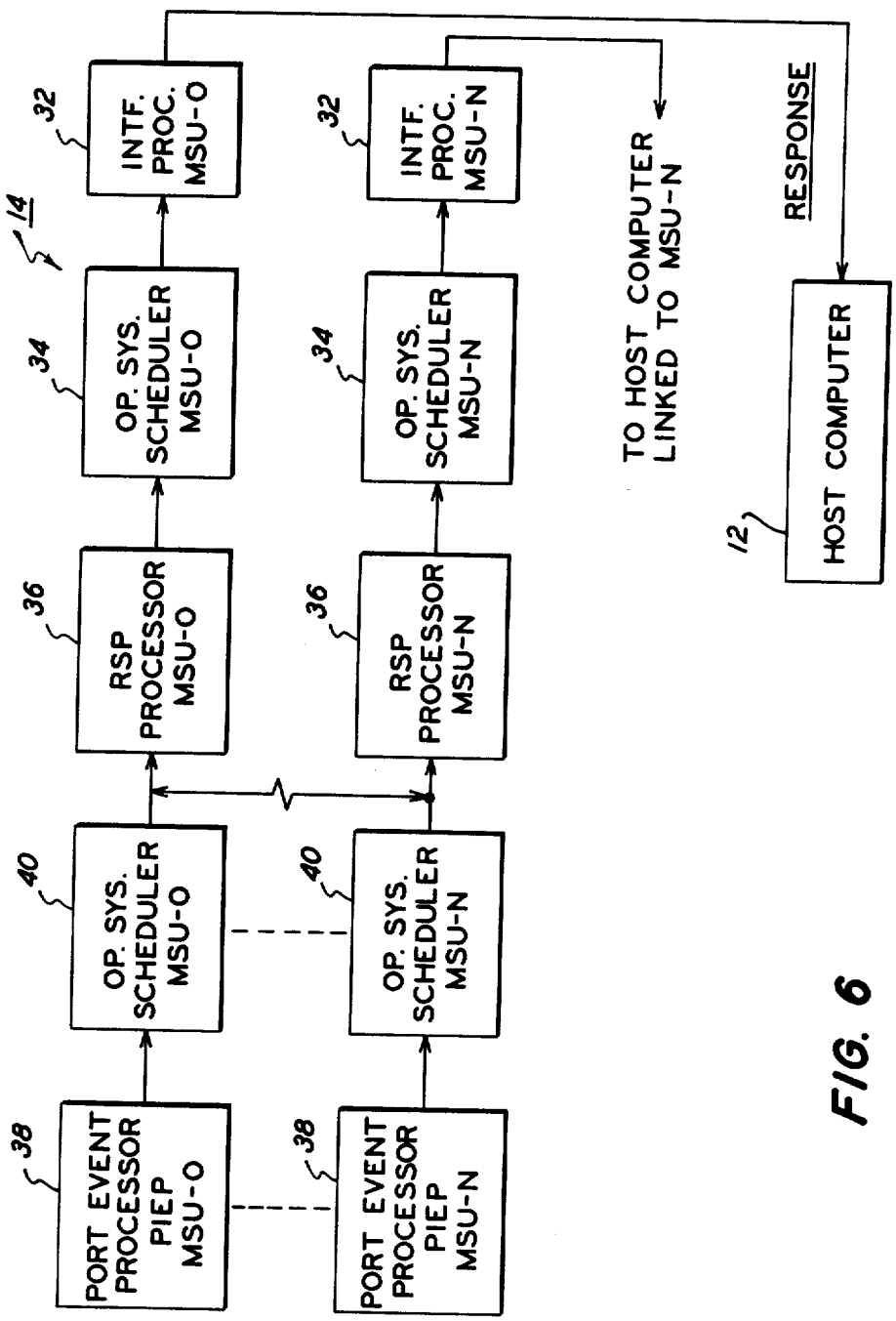
FIG. 6 is a block diagram showing the system illustrated in FIG. 1 in greater detail, when operating to provide responses upon execution of the switching events to the host computer.

FIG. 6 illustrates how a response message related to a port is conveyed to the host computer 12. Either the switching or control action or event has been executed or some other response as to the state of the port is scanned and is scheduled to be transmitted to the host computer. The identification of the location of the host computer (the MSU shelf to which it was connected) is part of the command message and is stored, as in a RAM location. The operating system 40 then uses the information in this RAM location to convey the message from the PIEP processor which contained the port at which the event occurred to the RSP processor in the MSU having the host computer connected thereto. It then is transmitted to an input queue in the RSP processor 36 of the shelf to which the host computer is connected. Once the RSP processor's input queue contains a response message it is scheduled and passed under control of the schedulers 34 to the interface processor 32. The interface processor formats the data back into serial asynchronous form in accordance with the link standard and transmits the data back to the host computer.

TABLE A

COMMANDS HOST COMPUTER TO MSP

| Name | Format(*) | Description |
|---|---|---|
| Administration | AD ac | Changes MSP data-base (e.g. Class of Serv.) |
| Answer | AW eeee [pppp] | Supply answer supervision to trunk |
| Debus | DB eeee | Returns I.D. and setup characteristics of port. |
| Debus connect | DC eeee | Returns current connection of spec'd. port. |
| Debus digits rec'd. by port. | DD eeee | Returns digits sent or |
| End | EN | Synchronizes all ports of an INIT condition. |
| Give path | GP eeee pppp[ssss [pppp]]talk paths (or tones). | Sets up 1 or 2-way |
| Hookflash | HF eeee [ssss [ssss]] | Gives precision hookflash to Answer Service Interface. |
| Initialize | IN | Immediately places MSP in inactive state. |
| Receive digits | RD eeee ss[d][pppp] | Used to obtain feature codes dialed by a port. |
| Release | RL eeee [xx[d] [pppp]] | Initiates port transitioning to idle. |
| Reserve | RV hhhhh | Reserves a member of a service acct. spr. or line or trk group. |
| Ring | RI sssss [pppp] | Apply ringing to the |

TABLE A-continued

COMMANDS HOST COMPUTER TO MSP

| Name | Format(*) | Description |
|---|---|---|
| | | spec'd. line port. |
| Send digits | SD eeee d . . . d | Send digits from the MSP on a trunk. |
| Seize port | SP sssss [pppp] | Seizes a trunk and optionally connects to a port. |
| Start | ST | Initiates processing of SP commands. |

(*)See Table C for explanation of arguments (lower case letters in format column).
Note the [ ] brackets surround optional arguments.

TABLE B

RESPONSES MSP TO HOST COMPUTER

| Name | Format(*) | Response from |
|---|---|---|
| Admin Responses | AD ar | Admin |
| Answer off/on | AF/AN eeee | Ans. Supervision |
| Confis. error | CE m | START, INIT, END |
| Debus | DB eeee at [har vv xx] | DEBUG |
| Debus connect | DC eeee pppp [pppp] | DEBUG CONNECT |
| Debus digits | DD eeee d . . . d | DEBUT DIGITS |
| Digits | DG eeee d . . . d | Digits received |
| Digits sent | DS eeee | SEND DIGITS |
| End ACK | EA | END |
| System syntax error | ?? nnn t . . . t | Command error |
| Initialize ACK | IA | Initialize |
| Off-Hook/On Hook | OF/ON eeee | Line or Trunk Status |
| Error | ER eeee nn [vv] | Processing error |
| Reserve ACK | RA ggggg [eeee] RA sg eeee | RESERVE |
| Reserve NAK | RN ggggg [eeee] RN sg | RESERVE |
| MSP Alarm | AA am | Internal alarm |
| Seize ACK | ZA ggggg [eeee] | SEIZE PORT |
| Seize NAK | ZN ggggg | SEIZE PORT |
| Rins ACK | GA ggggg [eeee] | RING |
| Ring NAK | GN ggggg | RING |
| Start ACK | SA | START |

(x)See Table C for explanation of arguments (lower case letters in format column).
Note the [] brackets surround optional arguments.

TABLE C

Explanation of Arguments in Tables A and B

| Argument: | Explanation |
|---|---|
| ac | ADMIN Command |
| ar | ADMIN Response |
| am | ALARM Message |
| c | Conference Selector 1 or 2 for Conference Group being used |
| ct | Circuit type Mnemonic |
| d | Dialtone Flash (Y or N) |
| d . . . d | Digits (0 to 16) |
| eeee | Equipment Number |
| Geeee | Group Indicator (eeee is a member of the group) |
| har | Port Conditions (1 = Yes, 0 = No); Hook (1 = on-hook), Answer (1 = answer on) Receiver (1 = Receiver or Sender attached) |
| ggggg | Geeee or eeee |
| hhhhh | ggggg or sg |
| m | Shelf numbers of "bad" shelves |
| nn | Error Number |
| pppp | eeee[w[c]] or tt[c] |
| sg | Service Circuit Group (C4, C8, DR, RS) |
| ssss | Timer Value in tenths of seconds |
| tt | Tone Type (RB (ringback), EB (equipment busy) DT, etc.) |
| vv | Command Mnemonic of last command |
| w | Path Indicator (1 or 2 way) |
| xx | Expected Count or Sent Digit Count (00 to 16) |

TABLE C-continued

| Explanation of Arguments in Tables A and B | |
|---|---|
| Argument: | Explanation |
| t . . . t | Host Message with Error Condition |

From the foregoing description it will be apparent that there has been provided an improved communication switching system which is adapted to provide special switching applications without requiring the generation of complex telecommunications switching processes but rather by programs which may be executed in a general purpose computer. Variations and modifications of the herein described system within the scope of the invention will undoubtedly suggest themselves to those skilled in the art. Accordingly, the foregoing description should be taken as illustrative and not in a limiting sense.

We claim:

1. A communication switching system which comprises communications switching means having a plurality of ports and effecting switching events at said ports including making connections between a plurality of telephone lines and/or trunks connected to said ports, host computer means for generating digital signal commands having a predetermined structure and corresponding to a plurality of switching events and for receiving digital signal responses also having said predetermined structure and being related to the execution of said switching events at said ports, interface means for linking said computer means and said switching means in communicating relationship for said digital signals, said switching means having processing means responsive to said commands for formatting and scheduling telephone switching data and executing said data for carrying out said switching events at said ports, and said switching means also having means for conveying said commands to said processing means for the ones of said ports at which said switching events are to be carried out for controlling said events exclusively in response to said commands and the state of said ports.

2. The system according to claim 1 wherein said switching means comprises a plurality of modular switching units each having a different group of said plurality of ports and each having a separate set of said processing and conveying means, means interconnecting said units to each other for distributing said digital signal commands from said interface means among all of said units and said digital signal responses to said interface means from all of said units.

3. The system according to claim 1 wherein said host computer means has means for generating said digital signal commands in a format which identifies a switching event and the one of said plurality of ports at which said event is to be carried out.

4. The system according to claim 2 wherein said host computer means has means for generating said digital signal commands in a format which identifies a switching event and the one of said plurality of ports where said event is to be carried out in terms of the one of said modular switching units having said one port and the location of said port therein.

5. The system according to claim 4 wherein each of said modular switching units has a plurality of circuit positions at which a plurality of circuits providing the ports are located, and wherein said digital signal commands format generating means provides said format with a plurality of bytes corresponding to said commands, at least one byte representing the one of said modular switching units having said one port and a plurality of bytes representing the circuit position and the port thereon of said one modular switching unit.

6. The system according to claim 2 wherein a plurality of said interface means are provided, each associated with a different one of said modular switching units, said host computer means being at least one general purpose computer connected to one of said interface means.

7. The system according to claim 6 wherein said processing means includes means for generating said digital signal responses for each event which is effected in a format having a plurality of bytes which represent the execution of said events and the ones of said plurality of ports at which said events are executed in terms of the switching unit having said one port and the position of said one port in said switching unit which provides said one port.

8. The system according to claim 7 wherein means are provided in each of said units for routing said digital signal responses to the one of said plurality of interface means to which the host computer means to which said responses correspond is connected.

9. The system according to claim 1 wherein said interface means comprises means providing an asynchronous, serial digital data channel.

10. The system according to claim 1 wherein said switching system further comprises means for translating said commands from high level to low level machine language digital signals for use in said processing means thereof.

* * * * *

REEXAMINATION CERTIFICATE (2438th)
United States Patent [19]
Caplan et al.

[11] B1 4,527,012
[45] Certificate Issued Dec. 13, 1994

[54] COMMUNICATIONS SWITCHING SYSTEM WITH MODULAR SWITCHING COMMUNICATIONS PERIPHERAL AND HOST COMPUTER

[75] Inventors: Jerome S. Caplan, Henrietta; James W. Delmege, Rochester; Robert R. Laman, Rochester; Christine Navarro, Rochester, all of N.Y.

[73] Assignee: Redcom Laboratories, Inc., Fairport, N.Y.

Reexamination Request:
No. 90/003,281, Dec. 20, 1993

Reexamination Certificate for:
Patent No.: 4,527,012
Issued: Jul. 2, 1985
Appl. No.: 462,583
Filed: Jan. 31, 1983

[51] Int. Cl.$^5$ .................. H04Q 3/54; H04Q 3/545
[52] U.S. Cl. .................. 379/284; 379/269; 379/383
[58] Field of Search .............. 379/269, 284, 94, 98, 379/93, 383, 384, 385

[56] References Cited

U.S. PATENT DOCUMENTS

| | | | |
|---|---|---|---|
| 4,210,783 | 7/1980 | Vicari et al. | 379/214 |
| 4,256,926 | 3/1981 | Pitroda et al. | 379/269 |
| 4,521,879 | 6/1985 | Gueldenpfennig et al. | 370/62 |
| 4,556,970 | 12/1985 | Flanagin et al. | 370/58 |

FOREIGN PATENT DOCUMENTS 47-24705 7/1972 Japan.
57-45762 3/1982 Japan.

OTHER PUBLICATIONS

United Technologies Exchange, UTX TM –1001, Installation and Maintenance Manual (1983 Ed.), Sections 1, 3, 5, 6, & 7 and United Technologies Lexar Telephone Commands, Doc. No. 80–0013–F, Jan. 4, 1985.
United Technologies Lexar–Matrix Switch Card Hardware Reference Manual, Doc. No. 81–0050–C, Jul. 12, 1984.
Bell System Tech. Journal vol. 61 No. 4, Apr. 1982, Entire Issue on No. 10 Remote Switching System.
Pitroda et al., Issue 76, The Microprocessor Controlled 580 Digital Switching System.
W. Montgomery, IEEE 1980, Generating Exploratory Telecommunication Software Using Functional Simulation.
R. E. Cardwell, Circa 1975, Experiments with New Telecommunications Service Capabilities.
J. M. Ginsparg et al., IEEE 1981, Automatic Programming of Features for an Experimental Digital Switch.
R. W. Lucky, Circa 1974, A Flexible Experimental Digital Switching Office.
R. C. Cheung et al., IEEE 1979, Functional Multiprocessing in an Experimental Digital Switching Office.
T. Johnson et al., IEEE 1981, Architecture of the focus TM System Five TM Digital Central Office.
B. J. Eckhart et al. IEEE 1978, DMS-200 System Evolution.
H. G. Jud et al., IEEE 1981, A Modern Integrated PABX With Centralized Message Recording and Remote Distribution.
Electro/81 Conference Record, 7–9 Apr. 1981, New York, paper 3/3, pp. 1–6, Electronic Conventions, Inc. El Segundo, U.S., C. J. Breidenstein et al.
Proceedings of the Sixth International Conference on Computer Communications, 7–10 Sep. 1982, London, pp. 351–356, North–Holland Publishing Co., Amsterdam, NL., D. A. Pitt.
International Switching Symposium, 21–25 Sep. 1981, Montreal, Session 34A, Paper 4, pp. 1–6, CA., R. H. Bourgonjon et al.
Commutation & Transmission, vol. 2, No. 4, Dec. 1980, pp. 81–91, Paris Fr., A Veillon.
1978 International Conference on Communications, Conference Record, 4–7 Jun. 1978, vol. 3, paper 44.1, pp. 1–5, IEEE, U.S., S. Belli et al.
Telecom Report, vol. 4, 1971, "Beiheft", Digitalvermittlungssystem EWSD, pp. 13–18, Munich, DE., H. Eberding.
First Annual Phoenix Conference on Computers and Communications, 9–12 May 1982, Phoenix, Ariz., pp.

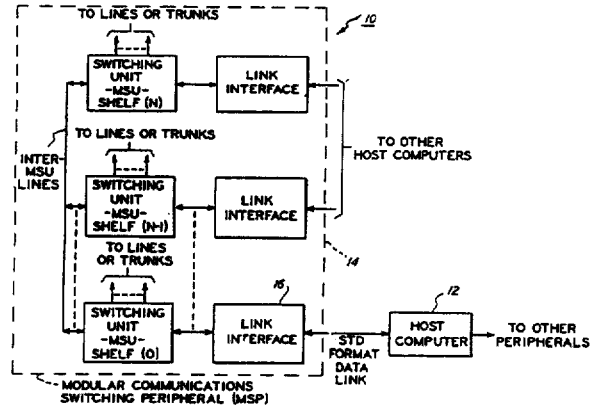

263-266, IEEE Computer Society Press, U.S., D. P. Bitner.

GTE Automatic Electric World-Wide Communications Journal, vol. 20, No. 1, Jan.-Feb. 1982, pp. 21-27, Northlake, Ill., U.S., D. R. Anderson et al.

IEEE International Conference on Communications; 12-15 Jun. 1977, vol. III, Paper 20.4, pp. 66-70, New York, U.S., T. Yamaguchi et al.

International Conference on Communications, 4-7 Jun. 1978, Toronto, Canada, vol. 2, Paper 32.2, pp. 1-5, IEEE, U.S., C. Cesaratto et al.

*Primary Examiner*—Thomas W. Brown

[57] ABSTRACT

A communications switching system is controlled as a peripheral device to a general purpose digital host computer or other host device. The switching system has a plurality of ports for telephone lines and/or trunks and makes connections to the ports. The host computer is programmable at high level to obtain customized switching applications. The switching processes are carried out in the switching system under control of high level commands. The commands are formatted to identify the command functions and the ports at which the switching and control actions are to be carried out. These ports may be provided by separate modular switching units, each having processors for carrying out the switching functions at the designated ports and for distributing the commands in accordance with the command format to the designated port regardless of which of the modular switching units has the port. Responses as to the execution of the switching events are also conveyed to the host computer in a format which designates the response function and the port at which the function occurred. The switching units may be equipped with asynchronous serial data links for connecting one or more host computers or devices to the modular switching peripheral units.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 4, 7 and 10 are determined to be patentable as amended.

Claims 2, 5, 6, 8 and 9, dependent on an amended claim, are determined to be patentable.

New claim 11 is added and determined to be patentable.

1. A communication switching system which comprises communications switching means having a plurality of ports and effecting switching events at said ports *in accordance with a telephone protocol under which said switching events are carried out, said switching events* including making connections between a plurality of telephone lines and/or trunks connected to said ports, host computer means *to which said communication switching means operates as a peripheral device, said host computer means being programmable independently of said communications switching means in a host computer language different from said telephone protocol, said host computer means having means* for generating *in said host computer language* digital signal commands having a predetermined structure and corresponding to a plurality of switching events and for receiving *in said host computer language* digital signal responses also having said predetermined structure and being related to the execution of said switching events at said ports, interface means for linking said *host* computer means and said switching means in communicating relationship for said digital signals *in said host computer language*, said switching means having *first* processing means responsive to said commands *in said host computer language* for formatting and scheduling telephone switching data from said host computer means in accordance with said telephone protocol and reformatting telephone switching data from said switching means into said digital signal responses in said host computer language and having second processing means for executing said telephone switching data from said host computer after formatting thereof for carrying out said switching events at said ports, and said switching means also having means for conveying said *digital signals in accordance with said telephone protocol corresponding to said* commands to said *second* processing means for the ones of said ports at which said switching events are to be carried out for controlling said events exclusively in response to said commands *which are formatted as said telephone switching data and to the state of said ports*.

3. The system according to claim 1 wherein said host computer means has means for generating said digital signal commands in a format *in said host computer language* which identifies a switching event and the one of said plurality of ports at which said event is to be carried out.

4. The system according to claim 2 wherein said host computer means has means for generating said digital signal commands in a format *in said host computer language* which identifies a switching event and the one of said plurality of ports where said event is to be carried out in terms of the one of said modular switching units having said one port and the location of said port therein.

7. The system according to claim 6 wherein said *second* processing means includes means for generating said digital signal responses for each event which is effected in a format having a plurality of bytes which represent the execution of said events and the ones of said plurality of ports at which said events are executed in terms of the switching unit having said one port and the position of said one port in said switching unit which provides said one port.

10. The system according to claim 1 wherein said switching system further comprises means for translating said commands from high level *in said host computer language* to low level machine language digital signals *representing said telephone switching data in accordance with said telephone switching protocol* for use in said *second* processing means thereof.

*11. The system according to claim 1, wherein said host computer means is a general purpose digital computer.*

* * * * *